(12) United States Patent
Pappachan et al.

(10) Patent No.: US 10,073,977 B2
(45) Date of Patent: Sep. 11, 2018

(54) TECHNOLOGIES FOR INTEGRITY, ANTI-REPLAY, AND AUTHENTICITY ASSURANCE FOR I/O DATA

(71) Applicant: Intel Corporation, Santa Clara, CA (US)

(72) Inventors: Pradeep M. Pappachan, Hillsboro, OR (US); Reshma Lal, Hillsboro, OR (US); Bin Xing, Hillsboro, OR (US); Steven B. McGowan, Portland, OR (US); Siddhartha Chhabra, Hillsboro, OR (US); Reouven Elbaz, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 224 days.

(21) Appl. No.: 14/974,874

(22) Filed: Dec. 18, 2015

(65) Prior Publication Data

US 2017/0024568 A1  Jan. 26, 2017

Related U.S. Application Data

(60) Provisional application No. 62/194,763, filed on Jul. 20, 2015, provisional application No. 62/195,148, (Continued)

(51) Int. Cl.
  *G06F 21/00* (2013.01)
  *G06F 21/60* (2013.01)
  (Continued)

(52) U.S. Cl.
  CPC ............ *G06F 21/602* (2013.01); *G06F 13/28* (2013.01); *G06F 17/30371* (2013.01);
  (Continued)

(58) Field of Classification Search
  CPC ...... G06F 21/602; G06F 21/64; G06F 21/606; G06F 17/30371; G06F 13/28; G06F 2221/031
  See application file for complete search history.

(56) References Cited

U.S. PATENT DOCUMENTS 7,716,389 B1    5/2010  Bruce
2004/0230797 A1* 11/2004  Ofek ...................... G06F 21/14
                                                          713/168
(Continued)

FOREIGN PATENT DOCUMENTS

WO    2012-010205    1/2012

OTHER PUBLICATIONS

International Search Report for PCT/US16/038397, dated Oct. 14, 2016 (3 pages).

(Continued)

*Primary Examiner* — Mahfuzur Rahman
(74) *Attorney, Agent, or Firm* — Barnes & Thornburg LLP

(57) ABSTRACT

Technologies for authenticity assurance for I/O data include a computing device with a cryptographic engine and one or more I/O controllers. A metadata producer of the computing device performs an authenticated encryption operation on I/O data to generate encrypted I/O data and an authentication tag. The metadata producer stores the encrypted I/O data in a DMA buffer and the authentication tag in an authentication tag queue. A metadata consumer decrypts the encrypted I/O data from the DMA buffer and determines whether the encrypted I/O data is authentic using the authentication tag from the authentication tag queue. For input, the metadata producer may be embodied as the cryptographic engine and the metadata consumer may be embodied as a trusted software component. For output, the metadata producer may be embodied as the trusted software component and the (Continued)

metadata consumer may be embodied as the cryptographic engine. Other embodiments are described and claimed.

25 Claims, 8 Drawing Sheets

Related U.S. Application Data filed on Jul. 21, 2015, provisional application No. 62/197,802, filed on Jul. 28, 2015.

(51) Int. Cl.
    *G06F 13/28*     (2006.01)
    *G06F 17/30*     (2006.01)
    *G06F 21/64*     (2013.01)

(52) U.S. Cl.
    CPC ............ *G06F 21/606* (2013.01); *G06F 21/64* (2013.01); *G06F 2221/031* (2013.01)

(56) References Cited

U.S. PATENT DOCUMENTS

| | | | |
|---|---|---|---|
| 2006/0080553 A1* | 4/2006 | Hall | G06F 12/0875 713/189 |
| 2008/0073437 A1 | 3/2008 | Laackmann | |
| 2010/0191910 A1 | 7/2010 | Gates | |
| 2012/0331307 A1* | 12/2012 | Fernandez Gutierrez | G06F 21/72 713/190 |
| 2014/0006797 A1 | 1/2014 | Cordella | |
| 2014/0089676 A1* | 3/2014 | Goto | G06F 21/52 713/189 |

OTHER PUBLICATIONS

Written Opinion for PCT/US16/038397, dated Oct. 14, 2016 (10 pages).

* cited by examiner

TECHNOLOGIES FOR INTEGRITY, ANTI-REPLAY, AND AUTHENTICITY ASSURANCE FOR I/O DATA

CROSS-REFERENCE TO RELATED APPLICATIONS

The present application claims priority under 35 U.S.C. § 119(e) to U.S. Provisional Patent Application Ser. No. 62/194,763, entitled "CRYPTOGRAPHIC PROTECTION OF I/O DATA FOR DMA CAPABLE I/O CONTROLLERS," which was filed on Jul. 20, 2015, to U.S. Provisional Patent Application Ser. No. 62/195,148, entitled "CRYPTOGRAPHIC PROTECTION OF I/O DATA FOR DMA CAPABLE I/O CONTROLLERS," which was filed on Jul. 21, 2015, and to U.S. Provisional Patent Application Ser. No. 62/197,802, entitled "TECHNOLOGIES FOR INTEGRITY, ANTI-REPLAY, AND AUTHENTICITY ASSURANCE FOR I/O DATA," which was filed on Jul. 28, 2015.

BACKGROUND

Typical computing devices may rely on software agents, such as anti-malware agents, for security. However, it is difficult to keep up with the increasing number of malware attacks on users' devices. To combat the malware threat, there is a trend to protect security sensitive software by running it inside a Trusted Execution Environment (TEE). TEEs provide a sterile environment that can protect secrets even when other parts of the system are compromised. Examples of TEEs include Intel® Software Guard Extensions (Intel® SGX), secure virtual machines (VMs), and a converged security engine (CSE). The TEE, while useful to protect secrets within the TEE, may not protect I/O data such as user and sensor data that is communicated into and/or out of the secure "container." The security requirements for trusted I/O vary per use case and device, and involve flavors and combinations of confidentiality, integrity, liveliness, and replay protection.

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory. The on-chip boundary forms a natural security boundary, where data and code may be stored in plaintext and assumed to be secure. Intel® SGX does not protect I/O data that moves across the on-chip boundary.

Trusted applications that process I/O data often require assurance that the data they consume (or produce) originated from a specific source device (for input) or will reach a specific device destination device (for output). Trusted applications may also need assurance that the integrity of the data in transit, between the application and the device, is preserved and that an adversary cannot replay data that was captured earlier. Integrity violations must be detectable by the trusted application (for input) or the consuming device (for output). For example, a banking application may require that the keyboard input from the user for a fund transfer transaction be integrity protected. Without integrity protection, malware on the platform could modify the user-entered transfer amount in memory before it is processed by the application, causing a different transaction to be executed than what the user intended.

There are known cryptographic algorithms to calculate an integrity measure over data, such as message authentication codes (MACs). Existing I/O controllers and software stacks (e.g., bus drivers, device drivers, etc.) do not carry this extra information in addition to the data. Additionally, many existing hardware devices and controllers do not support cryptographic primitives for generating the metadata required to validate integrity and authenticity.

Video capture controllers typically organize captured video data as circular queues of frame buffers. Video acceleration controllers typically organize captured data as pipelines of frame buffers. Frame buffer data is typically accessed by video capture and acceleration controllers in fixed-sized units, which are typically cachelines. Video acceleration hardware may access frame buffer data linearly (e.g., as sequential pixels), as tiles (e.g., arrays of pixels), or randomly.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
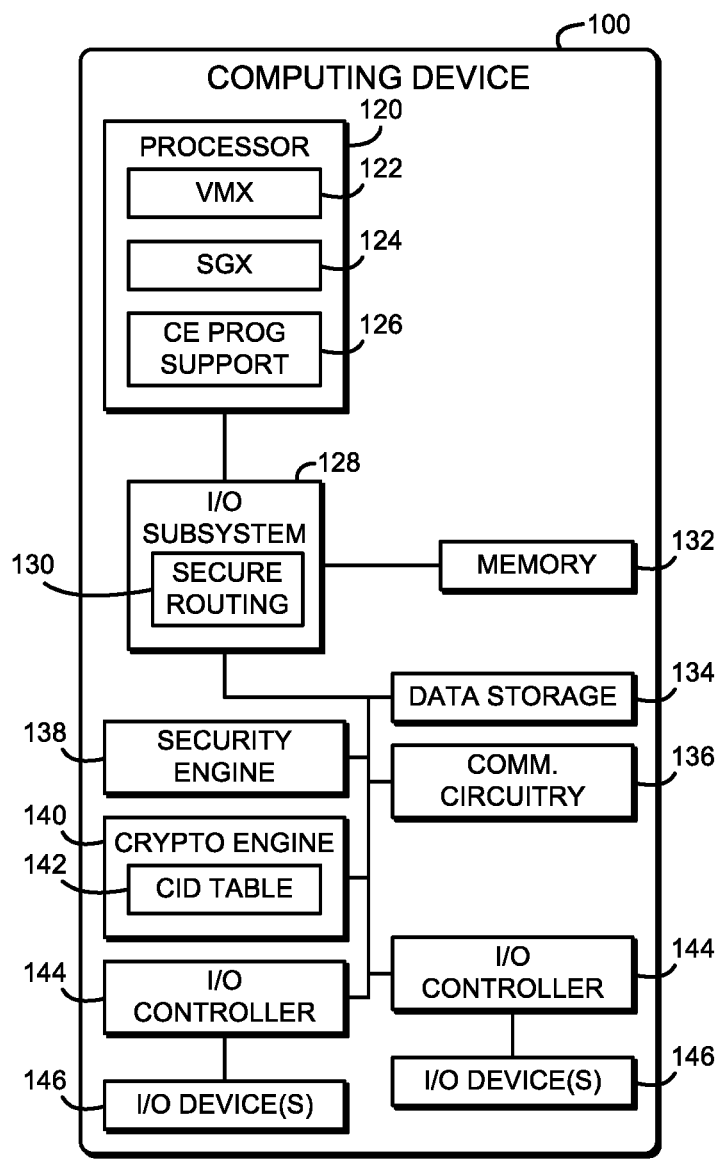
FIG. 1 is a simplified block diagram of at least one embodiment of a computing device for I/O data authenticity assurance.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for I/O authenticity verification includes, among other components, a processor 120, main memory 132, a hardware cryptographic engine 140, and one or more I/O controllers 144 in communication with one or more I/O devices 146. In use, the cryptographic engine 140 provides on-the-fly encryption and decryption of data transferred via direct memory access operations (DMAed) between the platform I/O controllers 144 and the memory 132. Each DMA transaction is tagged with a channel ID (CID) representing a flow of data associated with a particular I/O device 146 or set of I/O devices 146. The cryptographic engine 140 uses the CID to reliably identify transactions that must be protected, retrieve the corresponding encryption keys, and perform appropriate cryptographic operations on the DMA data. As further described below, the computing device 100 creates, reports, and verifies authentication information associated with DMA data from/to IO controllers 144 using the cryptographic engine 140. The computing device 100 generates and verifies integrity metadata, known as authentication tags (ATs) using an out-of-band mechanism that does not involve the I/O controllers 144. The computing device 100 uses a separate AT metadata stream between the cryptographic engine 140 and the system memory 132. In the case of input, the cryptographic engine 140 generates the AT metadata, which is written to a dedicated AT queue in the memory 132 (separate from the DMA buffer). In the case of output, trusted software generates the AT metadata and the cryptographic engine 140 reads the AT metadata from the AT queue and uses it to validate integrity. Thus, the computing device 100 may provide data origin authenticity, integrity, and replay protection of I/O data with zero hardware cost to the IO controllers 144 and/or devices 146, and may have a low cost/impact to the software stack (e.g., by avoiding impact to low-level I/O bus drivers). Additionally, the computing device 100 may size an AT queue to meet the latency and throughput requirements of a particular DMA channel.

In some embodiments, the computing device 100 may capture video frame data using a video capture controller. Additionally, the computing device 100 may accelerate or otherwise process the video frame data using a video acceleration controller. The computing device 100 may monitor for accesses to cachelines of the captured video frame data, for example by a video controller. The cachelines may be accessed linearly, in tiles, and/or randomly. In response to a cacheline access, the computing device 100 converts the address of the cacheline into an address of a corresponding authentication tag metadata structure. Thus, in those embodiments the computing device 100 may efficiently authenticate, integrity-check, anti-replay protect, or otherwise validate captured video frame data cachelines that may be accessed randomly.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 128, a memory 132, a data storage device 134, and communication circuitry 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include hardware virtualization support 122, secure enclave support 124, and crypto engine programming support 126.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The hardware virtualization support 122 may also support extended page tables (EPT), which may be embodied as hardware-assisted second-level page address translation. The hardware virtualization support 122 may be embodied as, for example, Intel® VT-x technology.

The secure enclave support 124 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 124 may be embodied as a set of processor instruction extensions that allows the processor 120 to establish one or more secure enclaves in the memory 132. For example, the secure enclave support 124 may be embodied as Intel® Software Guard Extensions (SGX) technology.

The crypto engine programming support 126 allows the processor 120 to program the cryptographic engine 140 to provide cryptographic protection of I/O data. In particular, the processor 120 may enable or disable encryption for certain I/O channels, and may securely provide encryption keys to the cryptographic engine 140. The crypto engine programming support 126 may be embodied as one or more specialized processor instructions (e.g., the instructions EBINDTIO, UNWRAP, or other instructions) and associated hardware, microcode, firmware, or other components of the processor 120. The crypto engine programming support 126 of the processor 120 may allow trusted software to program the cryptographic engine 140 while preventing untrusted software from programming the cryptographic engine 140.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 128, which may be embodied as circuitry and/or components to facilitate input/output operations with the processor 120, the memory 132, and other components of the computing device 100. For example, the I/O subsystem 128 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate input/output operations. The I/O subsystem 128 may further include secure routing support 130. The secure routing support 130 includes hardware support to ensure I/O data cannot be misrouted in the fabric 128 under the influence of rogue software. The secure routing support 130 may be used with the cryptographic engine 140 to provide cryptographic protection of I/O data. In some embodiments, the I/O subsystem 128 may form a portion of a system-on-a-chip (SoC) and be incorporated, along with the processor 120, the memory 132, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may include a security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor 120. Thus, the security engine 138 may be used to establish a trusted execution environment separate from code executed by the processor 120. The security engine 138 may communicate with the processor 120 and/or other components of the computing device 100 over a dedicated bus, such as a host embedded controller interface (HECI). The security engine 138 may also provide remote configuration, control, or management of the computing device 100. In the illustrative embodiment, the security engine 138 is embodied as a converged security and manageability engine (CSME) incorporated in a system-on-a-chip (SoC) of the computing device 100. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor 120), also known as "out-of-band" communication.

The cryptographic engine 140 may be embodied as any microcontroller, microprocessor, functional block, logic, or other circuit or collection of circuits capable of performing the functions described herein. As further described below, the cryptographic engine 140 may encrypt and/or decrypt I/O data read or written by the I/O controllers 144 in one or more direct memory access (DMA) operations to the memory 132. The cryptographic engine 140 includes an internal channel identifier (CID) table 142, which the cryptographic engine 140 uses to dynamically identify DMA channel(s) to be protected. The CID table 142 may be controlled and/or programmed by trusted software, for example using the crypto engine programming support 126 of the processor 120. The encryption keys and/or other secret information of the CID table 142 are not available to untrusted software. In some embodiments, the cryptographic engine 140 may be incorporated along with the I/O subsystem 128 and/or the processor 120 in a system-on-a-chip (SoC) of the computing device 100.

Similarly, the I/O controllers 144 may be embodied as any embedded controller, microcontroller, microprocessor, functional block, logic, or other circuit or collection of circuits capable of performing the functions described herein. In some embodiments, one or more of the I/O controllers 144 may be embedded in another component of the computing device 100 such as the I/O subsystem 128 and/or the processor 120. Additionally or alternatively, one or more of the I/O controllers 144 may be connected to the I/O subsystem 128 and/or the processor 120 via an expansion bus such as PCI Express (PCIe) or other I/O connection. As further described below, the I/O controllers 144 communicate with one or more I/O devices 146, for example over a peripheral communications bus (e.g., USB, Bluetooth, etc.). The I/O devices 146 may be embodied as any I/O device, such as human interface devices, keyboards, mice, touch screens, microphones, cameras, and other input devices, as well as displays and other output devices. As described above, the I/O controllers 144 and associated DMA channels are uniquely identified using identifiers called channel identifiers (CIDs). Each I/O controller 144 may assert an appropriate CID with every DMA transaction, for example as part of a transaction layer packet (TLP) prefix, to uniquely identify the source of the DMA transaction and provide liveness protections. The CID also enables the isolation of I/O from different devices 146.

In use, the cryptographic engine 140 may snoop all DMA transactions generated by the I/O controllers 144 to the memory 132. On each transaction to or from a device 146 capable of participating in trusted I/O, the cryptographic engine 140 references the CID table 142 to find the CID corresponding to the DMA channel in the CID table 142. A match indicates that the channel is currently protected and that the cryptographic engine 140 should use the channel key associated with the channel to protect the data written to and/or the data read from memory 132 (depending on the direction of the channel).

Figure 2:
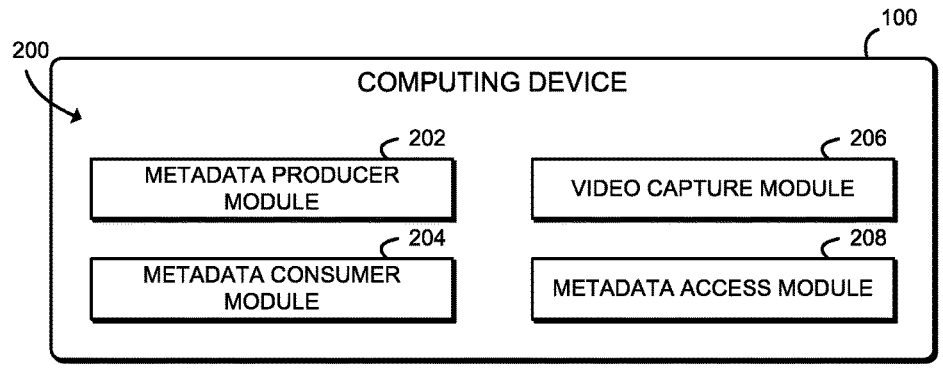
FIG. 2 is a simplified block diagram of at least one embodiment of an environment that may be established by the computing device of FIG. 1

Referring now to FIG. 2, in an illustrative embodiment, the computing device 100 establishes an environment 200 during operation. The illustrative environment 200 includes a metadata producer module 202, a metadata consumer module 204, a video capture module 206, and a metadata access module 208. The various modules of the environment 200 may be embodied as hardware, firmware, microcode, software, or a combination thereof. As such, in some embodiments, one or more of the modules of the environment 200 may be embodied as circuitry or collection of electrical devices (e.g., metadata producer circuitry 202, metadata consumer circuitry 204, video capture circuitry 206, and/or metadata access circuitry 208). It should be appreciated that, in such embodiments, one or more of the metadata producer circuitry 202, the metadata consumer circuitry 204, the video capture circuitry 206, and/or the metadata access circuitry 208 may form a portion of one or more of the processor 120, the I/O subsystem 128, the cryptographic engine 140, and/or other components of the computing device 100. Additionally, in some embodiments, one or more of the illustrative modules may form a portion of another module and/or one or more of the illustrative modules may be independent of one another.

The metadata producer module 202 is configured to perform an authenticated encryption operation on I/O data associated with an I/O controller 144 to generate encrypted I/O data and an authentication tag. The metadata producer module 202 is further configured to write the encrypted I/O data to a memory buffer associated with a direct memory access (DMA) operation and to write the authentication tag to an authentication tag queue in the memory 132. The authentication tag queue may be embodied as a linked list of authentication tag structure arrays. Each authentication tag structure array may occupy a memory page, and each authentication tag structure array may include a next array pointer and multiple authentication tag structures. The metadata producer module 202 may be configured to evaluate, by the cryptographic engine 140, a write condition to determine whether to write the authentication tag to the authentication tag queue. The metadata producer module 202 may be configured to accumulate the authentication tag in an accumulated authentication tag if it is determined not to write the authentication tag, and to write the accumulated authentication tag to the authentication tag queue if it is determined to write the authentication tag.

The metadata consumer module 204 is configured to decrypt the encrypted I/O data in response to the DMA operation and determine whether the encrypted I/O data is authentic using the authentication tag. The metadata consumer module 204 may be further configured to process the I/O data by a trusted software component or to output the I/O data by the cryptographic engine 140 to the I/O controller 144 in response to determining that the encrypted I/O data is authentic. The metadata consumer module 204 may be further configured to indicate integrity failure by the trusted software component or to execute a cryptographic engine 140 failure mode in response to determining that the encrypted I/O data is not authentic.

The video capture module 206 is configured to monitor for an access to a cacheline of a frame buffer data array. The frame buffer data array includes frame data captured by a video capture controller of the computing device 100. The metadata access module 208 is configured to determine a metadata address as a function of an address of the cacheline and to access a frame authentication tag structure using the metadata address. The frame authentication tag structure is included in a frame metadata array that corresponds to the frame buffer data array. The metadata access module 208 may be further configured to authenticate the cacheline of the frame buffer data with the frame authentication tag structure.

Figure 3:
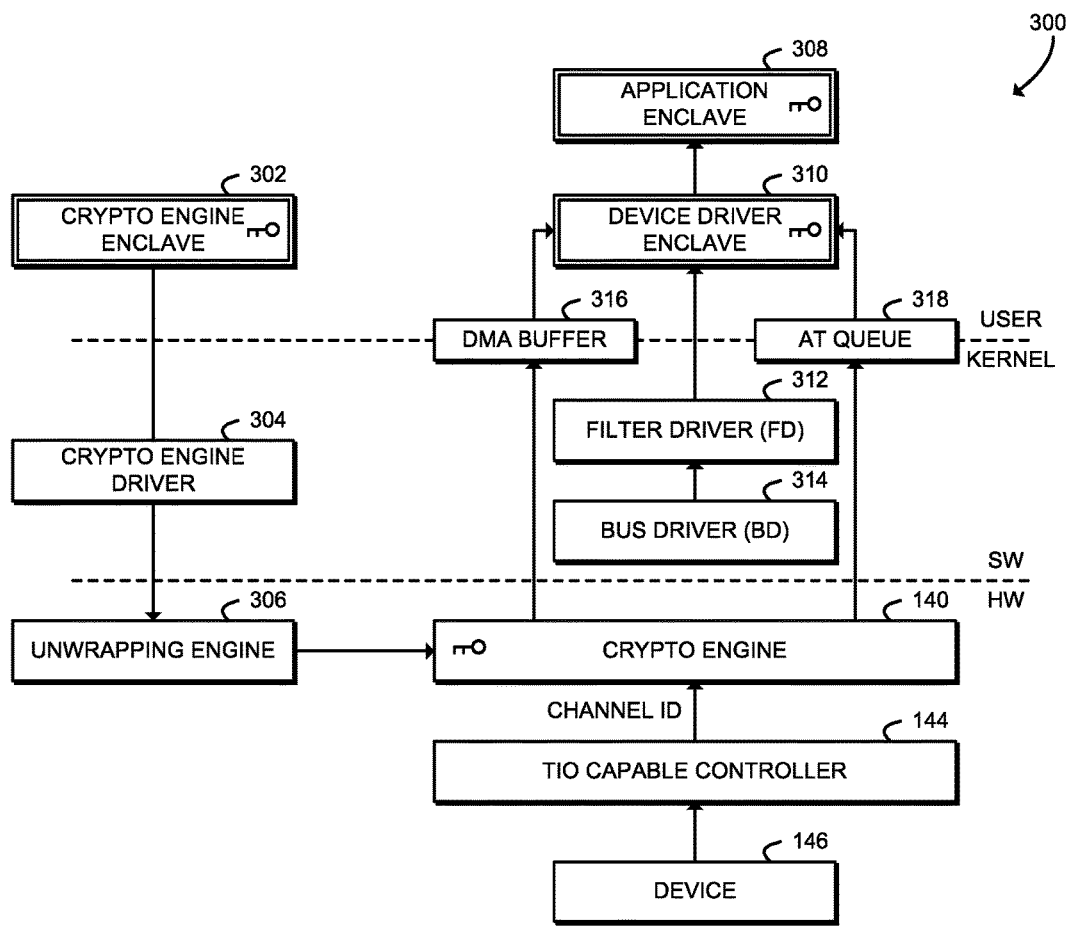
FIG. 3 is a simplified block diagram of at least one embodiment of a system architecture that may be established by the computing device of FIGS. 1-2.

Referring now to FIG. 3, diagram 300 shows at least one embodiment of a system architecture of the computing device 100. As shown, the architecture 300 includes hardware components, including the cryptographic engine 140, a trusted I/O capable controller 144, and an I/O device 146. Although illustrated as including a single I/O controller 144 and I/O device 146, it should be understood that the computing device 100 may include multiple I/O controllers 144 (which in turn may be connected to multiple I/O devices 146).

As shown, the software components of the system architecture include kernel mode software, including a crypto engine driver (CED) 304, a bus driver 314, and a filter driver 312, and user mode software, including a crypto engine enclave (CEE) 302, a device driver enclave (DDE) 310, and a trusted application 308. Encrypted I/O data from the I/O device 146 may be passed to the trusted application 308 via a DMA buffer 316, and authentication tag (AT) entries may be passed from the cryptographic engine 140 to the DDE 310 via an AT queue 318.

The AT queue 318 is allocated and managed by the CED 304, which may be embodied as a kernel mode (e.g., ring 0) driver that controls the cryptographic engine 140 and also programs the cryptographic engine 140 with the address of the AT queue 318. As described below, the cryptographic engine 140 may use the address of the AT queue 318 to determine where to write the AT metadata to (for input) and where to read the AT metadata from (for output). Thus, the responsibility of allocating and managing the AT queue 318, and the task of generating and using the AT metadata does not fall on either the I/O controller 144 or the low-level bus drivers 314 and does not impact them.

The CEE 302 may be embodied as user-level (e.g., ring-3) code protected with the secure enclave support 124 of the processor 120. The CEE 302 maintains or otherwise has access to encryption keys associated with one or more DMA channels. The CEE 302 may program the cryptographic engine 140 using the crypto engine programming support 126 of the processor 120. In particular, the CEE 302 may execute one or more specialized processor instruction to prepare wrapped channel programming information, including wrapped encryption keys that may be used to program the cryptographic engine 140. The CEE 302 may provide the wrapped programming information to the CED 304. The CED 304 provides the wrapped programming information to the unwrapping engine 306, which may unwrap and verify the binary blob and, if verified, program the channel programming information to the cryptographic engine 140. The unwrapping engine 306 may be embodied as hardware, firmware, and/or microcode resources of the processor 120 or the cryptographic engine 140.

Figure 4:
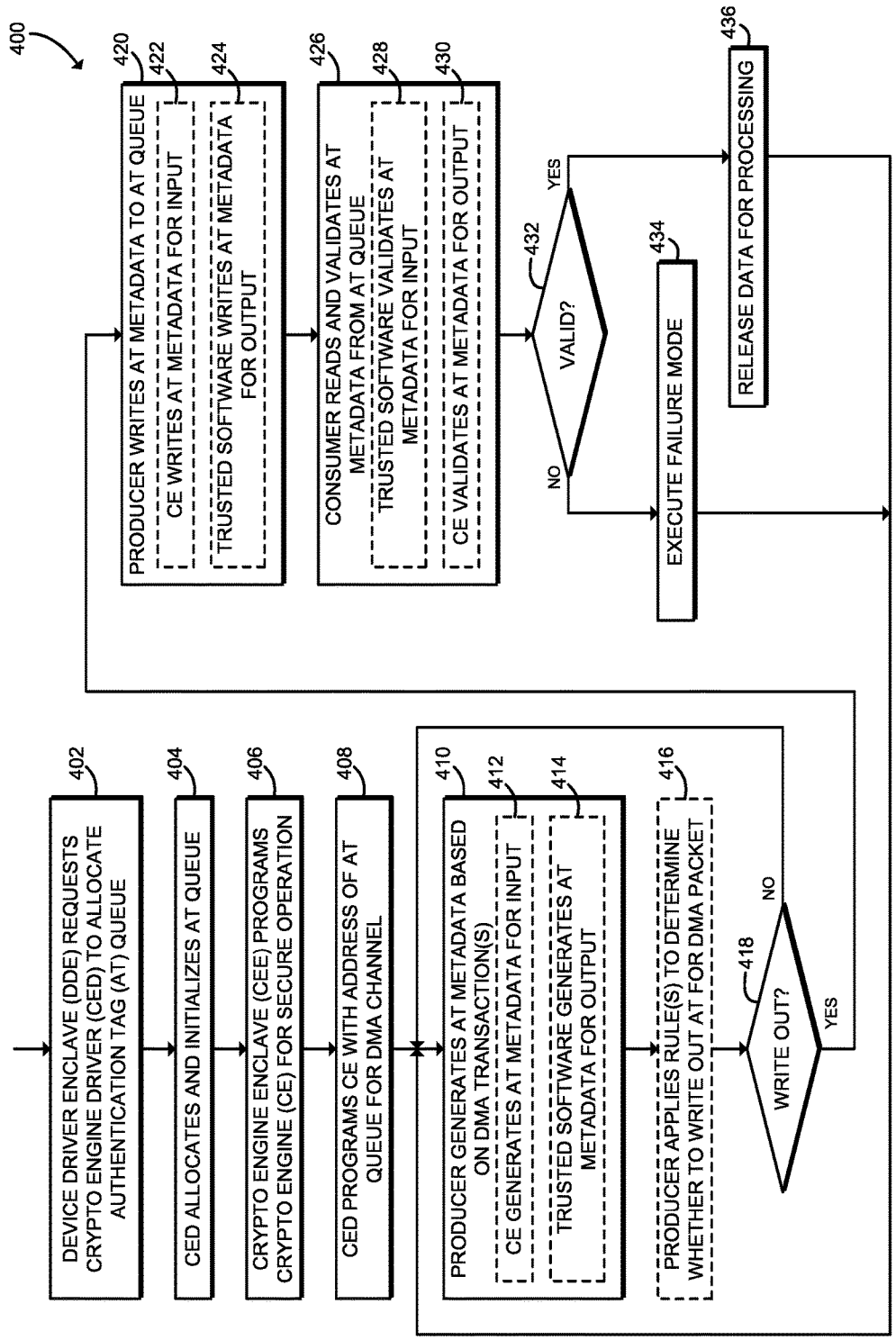
FIG. 4 is a simplified flow diagram of at least one embodiment of a method for I/O data integrity and authenticity assurance that may be executed by the computing device of FIGS. 1-3.

Referring now to FIG. 4, in use, the computing device 100 may execute a method 400 for I/O data integrity and authenticity assurance. The method 400 may be executed by a combination of hardware, firmware, and/or software of the computing device 100, including one or more secure enclaves executed by the computing device 100 as well as the cryptographic engine 140 of the computing device 100. The method 400 begins with block 402, in which a device driver enclave (DDE) 310 requests the crypto engine driver (CED) 304 to allocate an authentication tag (AT) queue 318. The DDE 310 for a particular I/O device 146 (associated with a DMA channel) may estimate the size of the AT queue 318 required to hold AT metadata for its associated DMA buffer 316. Since the size of the DMA buffer 316, the number of DMA transfers required to fill the buffer 316, and the size of each DMA transfer is known, the maximum size of the AT queue 318 may be determined to ensure that there is enough memory to hold all the AT entries corresponding to a given DMA buffer 316 until the data is verified. For example, in the case of audio input, an audio controller 144 may typically transfer 192 bytes of samples every 1 ms for low-latency audio CD quality stereo data. For that I/O controller 144, the associated audio driver DDE 310 may allocate two DMA buffers 316, each of size 1920 bytes. In that example, it takes 20 192-byte transfers to fill the two DMA buffers 316. Thus, the DDE 310 may request an AT queue 318 large enough to handle the AT metadata generated for all of the DMA transfers needed to fill the DMA buffers 316. The DDE 310 may, through the service hosting the DDE 310, request the CED 304 to allocate an AT queue 318 of the appropriate size.

In block 404, the CED 304 allocates and initializes the AT queue 318. The CED 304 may, for example, allocate one or more free pages in the memory 132 to store authentication tag metadata in one or more authentication tag structures (ATSs). The CED 304 may allocate an AT queue 318 for each DMA channel, which may provide one AT queue 318 per I/O device 146. Certain high-bandwidth channels may require an AT queue 318 larger than one page. Additionally, devices 146 supported by the cryptographic engine 140 may be hot-plugged, meaning that the DDEs 310 associated with these devices 146 may be loaded long after the OS has booted. However, the longer an operating system is running, the more difficult it may be to allocate buffers larger than one page (i.e., 4 kB). Accordingly, in some embodiments the AT queue 318 may be constructed out of an arbitrary number of page-sized arrays of ATSs that may be scattered in memory. The AT queue 318 may be organized as a circular queue of one or more ATS arrays.

Figure 5:
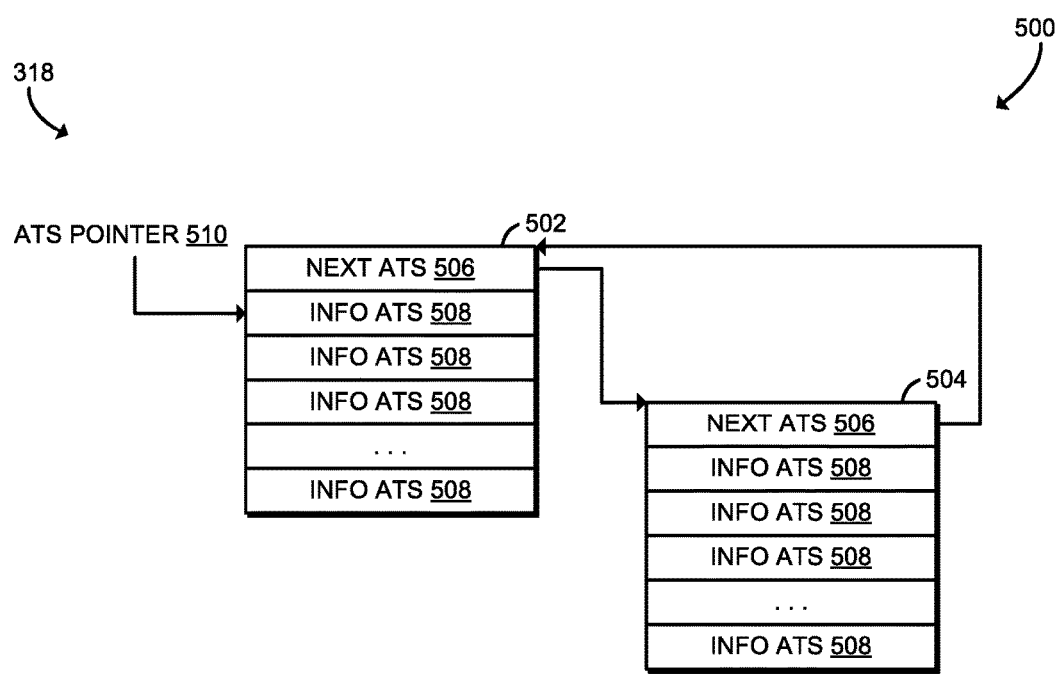
FIG. 5 is a schematic diagram illustrating at least one embodiment of an authentication tag queue that may be established by the computing device of FIGS. 1-3.

Referring now to FIG. 5, diagram 500 illustrates one potential embodiment of an AT queue 318. The illustrative AT queue 318 includes two ATS arrays 502, 504. Each ATS array 502, 504 is embodied as a page-sized array of ATS structures, including a next ATS 506 followed by multiple info ATSs 508. Each info ATS 508 may include AT metadata associated with one or more DMA transactions. To allocate an AT queue 318, software may allocate a page for each ATS array included in the AT queue 318, and then initialize the next ATS 506 entry of each ATS array to point to the next ATS array in the AT queue 318.

One potential embodiment of the format of an info ATS 508 is shown below in Table 1. As shown, the AT field is embodied as a 128-bit field generated using an integrity protection algorithm such as AES-GCM. The counter field is used as input to the initialization vector (IV) of the cryptographic algorithm. The counter field is used for replay protection. The consumer of the AT metadata may use the counter value in its IV when it performs authenticated decryption of the DMA data. The message length field may be used by the metadata consumer to match this AT with the portion of the DMA data over which the AT was computed (as described further below in connection with FIG. 6). The use of the cycle bit field is described below in the context of reads/writes from/to the AT queue 318. The maximum number of ATS entries in a one-page ATS array is determined by dividing page size by ATS size, which in the illustrative embodiment is 128.

TABLE 1

Info ATS Format

| Name | Size | Description |
| --- | --- | --- |
| Authentication Tag (AT) | 128 b | AT information for Message Length data. |
| Counter | 64 b | CE Counter value used to compute the AT for this ATS. |
| Message Length | 12 b | Identifies the number of bytes covered by this ATS. |
| End of Message (EOM) | 1 b | For Output: this flag may be asserted by software to identify the last ATS of an output message. If asserted, the cryptographic engine 140 shall apply the Skip Length when it returns the read completion data of the transaction following the last transaction of the current output message. For Input: this flag shall be asserted in the ATSs written by the cryptographic engine |

TABLE 1-continued

Info ATS Format

| Name | Size | Description |
| --- | --- | --- |
| Cycle bit (Cyc) | 1 b | 140 if the ATS includes data from an input transaction with the EOM flag set. This field shall be initialized to 0 at power up and toggled each subsequent pass through the ATS Queue. |

One potential embodiment of a next ATS 506 is shown below in Table 2. As shown, the pointer to the next ATS array field includes the high-order bits for the page address of the next ATS array in the AT queue 318. For example, as illustrated in FIG. 5, the next ATS 506 of the ATS array 502 points to the ATS array 504, and the next ATS 506 of the ATS array 504 points to the ATS array 502, establishing a circular AT queue 318.

TABLE 2

Next ATS Format

| Name | Size | Description |
| --- | --- | --- |
| Reserved | 12 b | Set to zero when written |
| Pointer to next ATS array | 52 b | High order bits of page address of next ATS array |
| Reserved | 191 b | Set to zero when written |
| Toggle Cycle (TC) | 1 b | This field shall be set to 1 to indicate the end of an AT queue |

As shown in FIG. 5, an ATS pointer 510 may be used to reference an ATS entry. The illustrative ATS pointer 510, which may be maintained inside the cryptographic engine 140, includes a base address, an index counter, and a number of low-order zero bits. The base address provides the high order bits of a page aligned address for the ATS array, in the illustrative embodiment, the ATS array 502. The index counter references the current ATS in the ATS array. The low order bits of the ATS pointer 510 are zero, with the number of zero bits representing the size of an ATS entry (e.g., a next ATS 506 or an info ATS 508). As shown, processing of ATSs may start at entry 1, the first info ATS 508. When the index counter of the ATS pointer 510 wraps around at the end of the page, the zeroth entry of the ATS array is interpreted as a next ATS 506. The next ATS 506 provides the base address of the next ATS array in the AT queue 318, which is illustratively the ATS array 504. For example, when the zeroth entry of an ATS array is encountered, the cryptographic engine 140 may simply overwrite the current value of the base address in the ATS pointer 510 maintained by the cryptographic engine 140 with the base address value defined in the next ATS 506.

Referring back to FIG. 4, in block 406, the crypto engine enclave (CEE) 302 programs the cryptographic engine 140 for secure operation. In particular, the cryptographic engine 140 is programmed to protect the DMA channel for a specific I/O device 146. In block 408, the CED 304 programs the cryptographic engine 140 with the address of the AT queue 318 to be used for the protected DMA channel. The CED 304 may program the cryptographic engine 140 with the address of the corresponding AT queue 318 for the protected DMA channel through an MMIO interface. The address of the AT queue 318 may be mapped into the virtual address space of the service hosting the trusted DDE 310 associated with the AT metadata.

In block 410, a metadata producer of the computing device 100 generates authentication tag (AT) metadata based on one or more DMA transactions. The metadata producer computes the authentication tag (AT) metadata using an authenticated encryption algorithm such as AES-GCM, using the encryption key used to protect the DMA channel. In addition to the AT metadata, additional information may be recorded to assist the integrity verifier and to manage the AT queue 318. As described further below, the metadata producer may be embodied as the cryptographic engine 140 for input data or as trusted software (e.g., the DDE 310) for output data.

In some embodiments, in block 412, the cryptographic engine 140 may generate the AT metadata based on one or more input DMA transactions. When the cryptographic engine 140 intercepts a DMA packet from the I/O device 146 and determines that the DMA data needs to integrity-protected, the cryptographic engine 140 computes the AT metadata for the DMA packet using the cryptographic key programmed into the cryptographic engine 140 for the DMA channel. In order to guarantee that input data actually originated from the device 146 that the software expected, the cryptographic engine 140 may mix the unique channel ID (CID) of the I/O device 146 (programmed into the cryptographic engine 140 by trusted software) into the cryptographic algorithm used to compute the AT metadata. Thus, if an attacker substitutes the original data with the attacker's own data, the trusted software will be able to detect that the attacker's data did not originate from the I/O device 146 that the trusted software was expecting because in computing the AT for the data, the trusted software will use the CID of the I/O device 146 and the unique key for the I/O device 146 before comparing it with the AT generated by the cryptographic engine 140. Similarly, in some embodiments, in block 414, trusted software such as the application enclave 308 and/or a device driver enclave (DDE) 310 may generate the AT metadata based on one or more output DMA transactions. The trusted software (e.g., the trusted DDE 310) may generate the AT metadata for the DMA output data using the encryption key used to protect the DMA channel.

In some embodiments, in block 416, the metadata producer (e.g., the cryptographic engine 140 or the trusted software component) may apply one or more rules to determine whether to write out the AT metadata for a DMA transaction. For example, instead of immediately writing out the AT metadata for the current DMA packet, in some embodiments the cryptographic engine 140 may accumulate the integrity measure over several DMA packets and write out a single AT for several DMA packets. The cryptographic engine 140 may write out AT metadata when one of several potential conditions is met. For example, the cryptographic engine 140 may write out AT metadata for a short packet; that is, the cryptographic engine 140 may write out AT metadata when a transaction is received that is less than the channel maximum transfer unit (MTU) of the I/O controller 144 for that channel. As another example, the cryptographic engine 140 may write out AT metadata if the number of bytes in the accumulated transactions for the same channel has reached a maximum length for AT generation, e.g., 4 kB. As another example, the cryptographic engine 140 may write out AT metadata if a transaction is received with a channel identifier (CID) that is different from the previous transaction. As another example, the cryptographic engine 140 may write out AT metadata if a transaction is received with the same CID as the previous transaction but the new transaction is not physically contiguous with the previous transaction (e.g., a page boundary has been crossed). As another example, the cryptographic engine 140 may write out AT metadata if a DMA transaction is received with the end of message (EOM) flag set.

In block 418, the metadata producer determines whether to write out the AT metadata. If not, the method 400 loops back to block 410, in which the metadata producer may generate additional AT metadata for subsequent DMA transactions. If the metadata producer determines to write out the AT metadata, the method 400 advances to block 420.

In block 420, the metadata producer writes the AT metadata to the AT queue 318. In some embodiments, in block 422, the cryptographic engine 140 may write the AT metadata for one or more input DMA transactions. In some embodiments, in block 424 the trusted software may write the AT metadata for one or more output DMA transactions.

To manage adding entries to the AT queue 318, the metadata producer (e.g., the cryptographic engine 140 and/or the trusted software) may maintain a logical enqueue pointer and a producer cycle state flag. The enqueue pointer represents the address of the next info ATS 508 to be added to the AT queue 318. When the AT queue 318 is initially set up, the enqueue pointer may be set to the address of the first info ATS 508 of the AT queue 318. In other words, the enqueue pointer may initially refer to ATS array offset 1 (the second ATS entry) of the first ATS array in the AT queue 318. As a logical entity, the enqueue pointer may not be accessible through physical registers. The cryptographic engine 140 may also maintain private copies of the input enqueue pointer for each AT queue 318 in the CID table 142, in an ATS pointer register for the CID table 142 entry corresponding to the DMA channel being protected. The metadata producer writes the AT metadata to an ATS structure at the location of the enqueue pointer in the AT queue 318.

The cycle bit (Cyc) field in an info ATS 508 may be used to identify the location of the enqueue pointer in the AT queue 318, which may eliminate the need to define a physical enqueue pointer register. When an AT queue 318 is initialized, the cycle bit of all info ATSs 508 shall be set to zero. As info ATSs 508 are written to the AT queue 318, the cycle bit is toggled. For example, in the first pass through the AT queue 318, all cycle bits are set to one, in the second pass they are set to zero, and so on. When a cycle bit transition is detected between two info ATSs 508, the cycle bit transition represents the location of the enqueue pointer. The producer cycle state flag maintained by the producer identifies the value that the producer shall write to the cycle bit.

As described above, the next ATS 506 entries in the AT queue may include a pointer to a next page-sized ATS array. When the toggle cycle (TC) flag of the next ATS 506 is set, the TC flag indicates that the end of the AT queue 318 has been reached, and that the value of the cycle bit should be toggled. As described above, the TC flag shall be set to 1 in the next ATS 506 of the last ATS Array in the AT queue 318 by software, to mark the end of the AT queue 318. It should be noted that a next ATS 506 is not written by the cryptographic engine 140, only read. Only software may write the next ATSs 506, because the software allocates the ATS arrays that form the AT queue 318.

The producer may use a dequeue pointer to determine when the AT queue 318 is full. The dequeue pointer, managed by a metadata consumer, represents the address of the last ATS that was processed by the metadata consumer. As the metadata producer processes info ATS 508 entries, the producer updates its copy of the dequeue pointer. If advancing the enqueue pointer would make it equal to the dequeue pointer, then the AT queue 318 is full.

Still referring to FIG. 4, in block 426, a metadata consumer of the computing device 100 reads and validates the AT metadata from the AT queue 318. The metadata consumer may match the AT metadata from the AT queue 318 with DMA transfer data stored in the DMA buffer 316 and then validate the integrity of the DMA data using the AT metadata. One potential embodiment of an AT metadata to DMA data matching and verification algorithm is described further below in connection with FIG. 6. In some embodiments, in block 428 the trusted software may validate the AT metadata for one or more input DMA transactions. For example, when the DMA transaction is completed and the trusted software (e.g., the trusted DDE 310) is notified of the DMA completion, the trusted software may read the AT data from the AT queue 318 using the AT-data matching algorithm and validate the integrity of the DMA data. In some embodiments, in block 430 the cryptographic engine 140 may validate the AT metadata for one or more output DMA transactions. For example, when the cryptographic engine 140 intercepts the output data to be read by the I/O controller 144, the cryptographic engine 140 reads the corresponding AT metadata from the AT queue 318. For output data, the cryptographic engine 140 verifies the integrity of the output data and releases the output data to the I/O controller 144 if the integrity check passes. In some embodiments, the cryptographic engine 140 may be both the metadata producer and the metadata consumer, for example when performing one or more DMA transactions to copy I/O data in the memory 132.

To manage reading entries from the AT queue 318, the metadata consumer (e.g., the trusted software and/or the cryptographic engine 140) may maintain a logical dequeue pointer and a consumer cycle state flag. As described above, the dequeue pointer represents the address of the last info ATS 508 that was processed on the AT queue 318 by the consumer. When the AT queue 318 is initially set up, the dequeue pointer may be set to the address of the first info ATS 508 of the AT queue 318. In other words, the dequeue pointer may initially refer to ATS array offset 1 (the second ATS entry) of the first ATS array in the AT queue 318. As a logical entity, the dequeue pointer may not be accessible through physical registers. The cryptographic engine 140 may also maintain private copies of the output dequeue pointer for each AT queue 318 in the CID table 142, in an ATS pointer register for the CID table 142 entry corresponding to the DMA channel being protected. The consumer reads the AT metadata from an ATS structure at the location of the dequeue pointer in the AT queue 318.

The metadata consumer may use the enqueue pointer to determine when the AT queue 318 is empty. As described above, the enqueue pointer may be represented as the location of a cycle bit transition between two info ATSs 508. As the consumer fetches info ATSs 508 from the AT Queue 318, the consumer checks for a cycle bit transition. If a cycle bit transition is detected, the AT queue 318 is empty. As described above, the consumer maintains the consumer cycle state flag, which the consumer may compare to the cycle bit in info ATS 508 entries that the consumer fetches. If the consumer cycle state flag is equal to the value of the cycle bit, then the consumer owns the info ATS 508 entry pointed to by the dequeue pointer and may process it. If the consumer cycle state flag and the value of the cycle bit are not equal, then the consumer shall stop processing info ATSs 508 and wait for a notification of more work. Trusted software may determine the last valid info ATS 508 written by the cryptographic engine 140 for an input channel by inspecting for the cycle bit transition. Similarly, the cryptographic engine 140 may determine the last valid info ATS 508 written by trusted software for an output channel by inspecting for the cycle bit transition.

Still referring to FIG. 4, in block 432, the metadata consumer determines whether the AT metadata is valid. If not, the method 400 branches to block 434, in which the metadata consumer executes an appropriate failure mode. For example, in some embodiments, the trusted software (e.g., the associated DDE 310) may be notified of the failure. The computing device 100 may handle the integrity failure by, for example, terminating the DMA transaction or changing the encryption key for computing the AT metadata to prevent the attacker from getting more information to break the integrity of the DMA channel data stream. As another example, in response to failure of the integrity check, the cryptographic engine 140 may also execute an appropriate failure mode. For example, for audio output data, in some embodiments the cryptographic engine 140 may send a packet of random bytes and/or blank data instead of sending the DMA data that was compromised. As another example, in some embodiments the cryptographic engine 140 may notify the trusted software of the failure through an interrupt, so that the trusted software can handle this situation. After executing the failure mode, the method 400 loops back to block 410, in which additional DMA transactions may be processed. Referring back to block 432, if the AT metadata is valid, the method 400 branches to block 436, in which the metadata consumer releases the DMA transaction data for processing. For example, the trusted software (e.g., the DDE 310) may release input data to the application enclave 308 for processing, and the cryptographic engine 140 may release output data to the appropriate I/O controller 144 for output. After releasing the data for processing, the method 400 loops back to block 410, in which additional DMA transactions may be processed.

Figure 6:
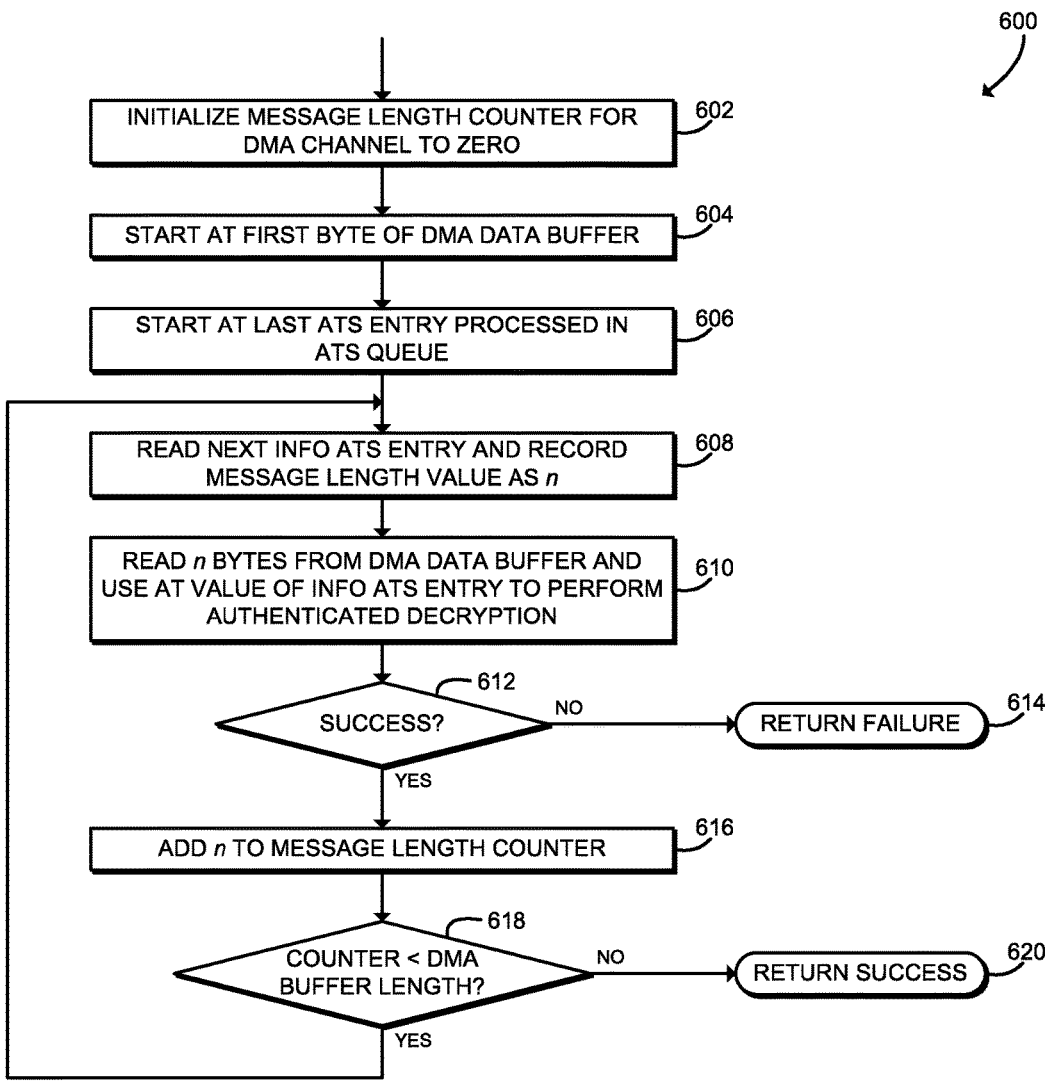
FIG. 6 is a simplified flow diagram of at least one embodiment of a method for data matching and authentication that may be executed by the computing device of FIGS. 1-3.

Referring now to FIG. 6, in use, the computing device 100 may execute a method 600 for matching authentication tags with associated DMA data. The computing device 100 may execute the method 600 during authenticated decryption to verify the integrity of the DMA data and to prevent replay in the system memory 132 by reading authentication tag (AT) data from the AT queue 318 and matching the AT metadata against data from the DMA buffer 316. As described above, the method 600 may be performed by the metadata consumer (i.e., the trusted software for input or the cryptographic engine 140 for output) in connection with block 426 of FIG. 4. The method 600 begins in block 602, in which the computing device 100 initializes a message length counter for the DMA channel to zero. In block 604, the computing device 100 starts at the first byte of the DMA data buffer 316. In block 606, the computing device 100 starts processing at the last ATS entry processed in the AT queue 318.

In block 608, the computing device 100 reads the next info ATS 508 entry from the AT queue 318 and records the value stored in the message length field of the info ATS 508 entry. The value stored in the message length field is further described as n. In block 610, the computing device 100 reads n bytes from the DMA data 316 buffer and uses the AT value in the current info ATS 508 entry to perform authenticated decryption of those n bytes. For example, the computing device 100 may perform AES-GCM authenticated decryption using the encryption key associated with the DMA channel, as described above. In block 612, the computing device 100 determines whether authentication was successful. If authentication was not successful, the method 600 returns failure in block 614. If authentication was successful, the method 600 advances to block 616.

In block 616, the computing device 100 adds the value n of the message length field of the info ATS 508 entry to the message length counter. In block 618, the computing device 100 determines whether the new value of the message length counter is less than the length of data stored in the DMA data buffer 316. If the new value of the message length counter is less than the length of data stored in the DMA data buffer 316, the method 600 loops back to block 608 to continue processing info ATS 508 entries. If the new value of the message length counter is not less than the length of data stored in the DMA data buffer 316, the method 600 returns success in block 620.

Since the size of the AT queue 318 is determined based on the size of the DMA buffer 316 associated with each DMA transfer, and the info ATS 508 entries for that buffer 316 are processed in response to their DMA completions (i.e., before the next transfer), the AT data may never be lost to buffer overwrites, even for high bandwidth devices. If trusted software has DMA data to process in its DMA buffer 316, the trusted software will find the corresponding AT data in the AT queue 318. The AT data and the DMA data may never get out of sync, because if there is no DMA transfer (e.g., when the trusted software is slow to process data and schedule new transfers), then no new AT data is generated. By using the message length field in the info ATS 508 entries, the algorithm described above in connection with method 600 may ensure that the info ATS 508 entries can be matched sequentially to the DMA data after each transfer.

Figure 7:
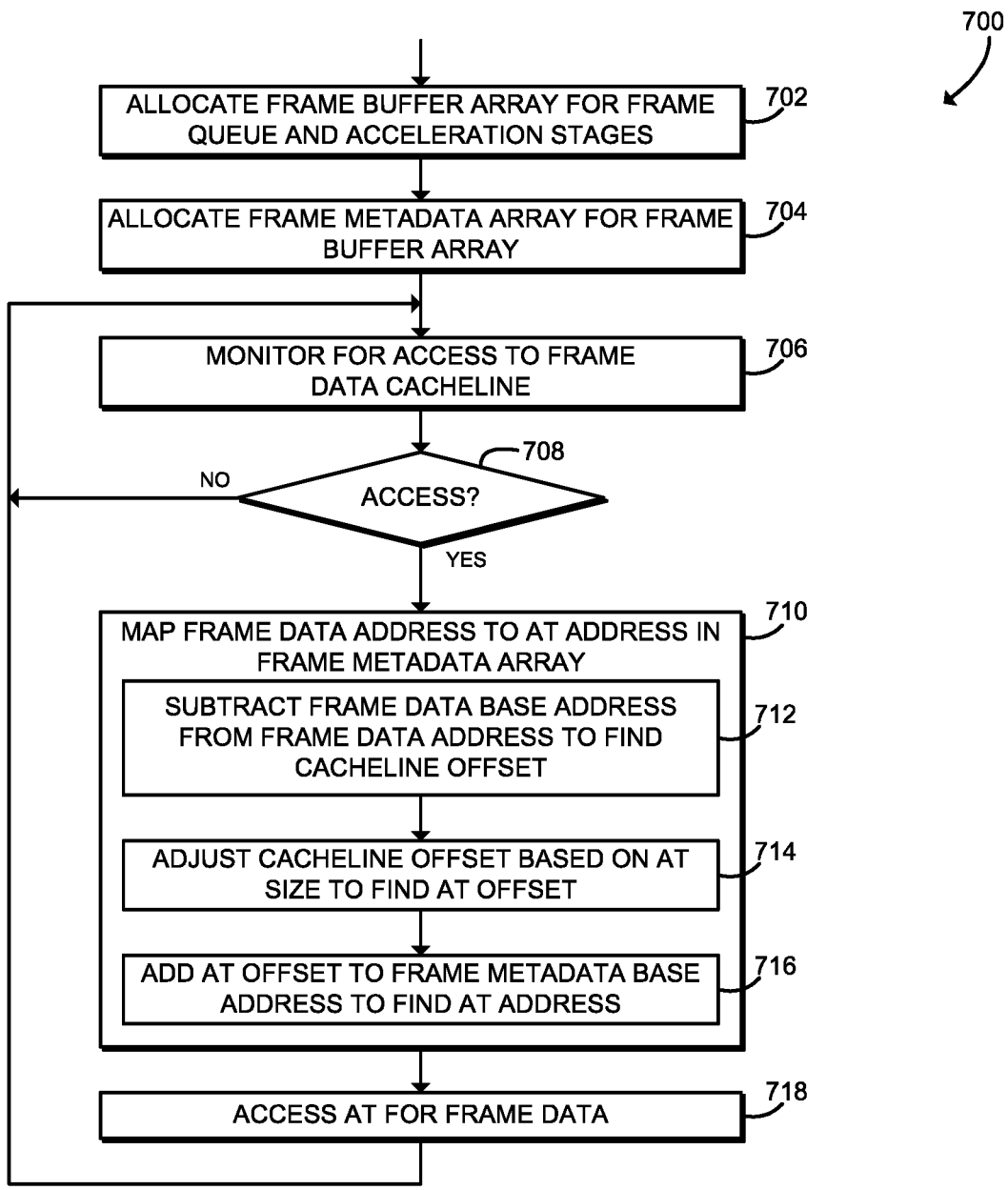
FIG. 7 is a simplified flow diagram of at least one embodiment of another method for I/O data integrity and authenticity assurance that may be executed by the computing device of FIGS. 1-3.

Referring now to FIG. 7, in use, the computing device 100 may execute a method 700 for I/O data integrity and authenticity assurance. The method 700 may be executed by any appropriate combination of hardware, firmware, and/or software of the computing device 100, including one or more secure enclaves executed by the computing device 100 as well as the cryptographic engine 140 of the computing device 100. The method 700 begins with block 702, in which the computing device 100 allocates a frame buffer data array for a frame buffer queue and acceleration stages used for video capture and processing. In particular, the computing device 100 allocates a frame buffer data array that is adapted for use with video capture and acceleration controllers. As described above, video capture controllers typically organize captured video frame buffer data as circular queues of frame buffers. Video acceleration controllers typically organize captured data as pipelines of frame buffers. Frame buffer data is typically accessed by video capture and acceleration controllers in fixed-sized units, which are typically cachelines. Thus, the computing device 100 may allocate a frame buffer data array as a two-dimensional array of frame data buffers, starting at a frame data base address in the memory 132. One dimension of the frame buffer data array corresponds to the number of frame data buffers (i.e., frames) stored in a frame buffer queue. The other dimension of the frame buffer data array corresponds to the number of stages in the acceleration pipeline. Each frame data buffer (i.e., frame) may include an integral number of cachelines.

In block 704, the computing device 100 allocates a frame metadata array for the frame buffer data array. The computing device 100 allocates a frame metadata array that directly corresponds to the frame buffer data array. Thus, the computing device 100 may allocate the frame metadata array as a two-dimensional array of metadata buffers starting at a metadata base address in the memory 132. One dimension of the frame metadata array corresponds to the number of frame data buffers stored in a frame buffer queue. The other dimension of the frame metadata array corresponds to the number of stages in the acceleration pipeline. Each metadata buffer includes authentication tag data that corresponds to each cacheline of a frame data buffer. In other words, a metadata buffer includes an integral number of authentication tags that is the same as the number of cachelines in a frame data buffer.

Figure 8:
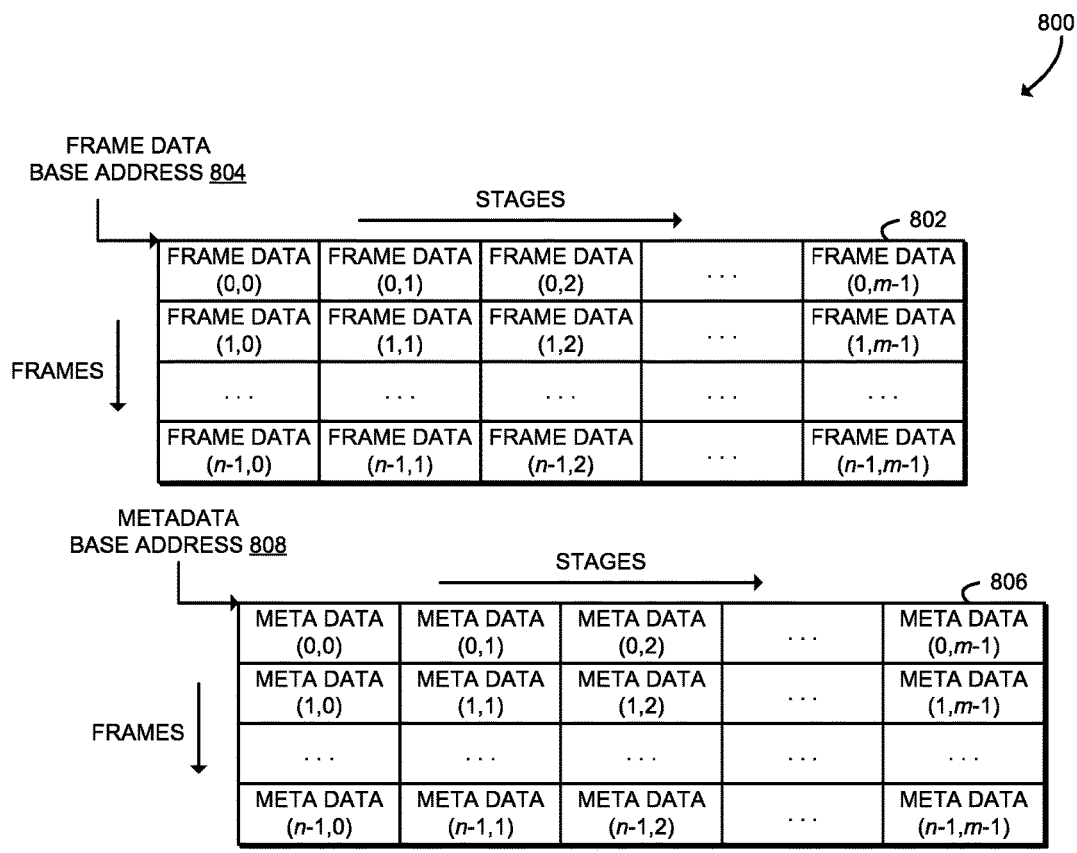
FIG. 8 is a schematic diagram illustrating data arrays that may be maintained by the computing device of FIGS. 1-3.

Referring now to FIG. 8, diagram 800 illustrates one potential embodiment of the frame buffer data array and the frame metadata array. As shown, a frame buffer data array 802 is located at a frame data base address 804, and is organized as a two-dimensional array of frame data buffers. The frame buffer data array 802 includes frame data buffers for n frames and m acceleration stages. A frame metadata array 806 is located at a metadata base address 808, and is organized as a two-dimensional array of metadata buffers. The frame metadata array 806 includes metadata buffers for n frames and m acceleration stages. Each frame data buffer (i, j) corresponds to a metadata buffer (i, j); for example, frame data buffer (0, 0) corresponds to metadata buffer (0, 0); frame data buffer (0, 1) corresponds to metadata buffer (0, 1); and so on. Each frame data buffer may include multiple cachelines, and each corresponding metadata buffer includes authentication tag data corresponding to each of those cachelines.

Referring back to FIG. 7, in block 706, the computing device 100 monitors for access to a cacheline within the frame buffer data array. The access may be generated, for example, by a video capture controller, video acceleration controller, or other hardware components of the computing device 100. In block 708, the computing device 100 determines whether a cacheline access has occurred. If not, the method 700 loops back to block 706 to monitor for accesses to the frame buffer data array. If a cacheline access has occurred, the method 700 advances to block 710.

In block 710, the computing device 100 maps the address of the frame data cacheline access to an authentication tag address in the frame metadata array. The computing device 100 may use any appropriate algorithm to map the addresses based on the layout of the frame buffer data array and the frame metadata array in the memory 132. In block 712, the computing device 100 may subtract the frame data base address from the address of the frame data cacheline access to find a cacheline offset. In block 714, the computing device 100 may adjust the cacheline offset based on the AT size to find an AT offset. For example, the computing device 100 may right- or left-shift the cacheline offset based on the relative sizes of cachelines and corresponding authentication tags. Continuing that example, if the size of a cacheline is 64 bytes and the size of an authentication tag corresponding to a cacheline is 32 bytes, the computing device 100 may right-shift the cacheline offset by one to determine the AT offset. In block 716, the computing device 100 adds the AT offset to the frame metadata base address to find the AT address.

In block 718, the computing device 100 accesses the AT metadata at the AT address determined in block 710. As described above, the AT metadata corresponds to the frame buffer data cacheline currently being accessed. Thus, the computing device 100 may use the AT metadata to authentication, integrity-check, anti-replay protect, or otherwise validate the frame buffer data. After accessing the AT metadata, the method 700 loops back to block 706 to continue monitoring for frame buffer data cacheline accesses.

Figure 9:
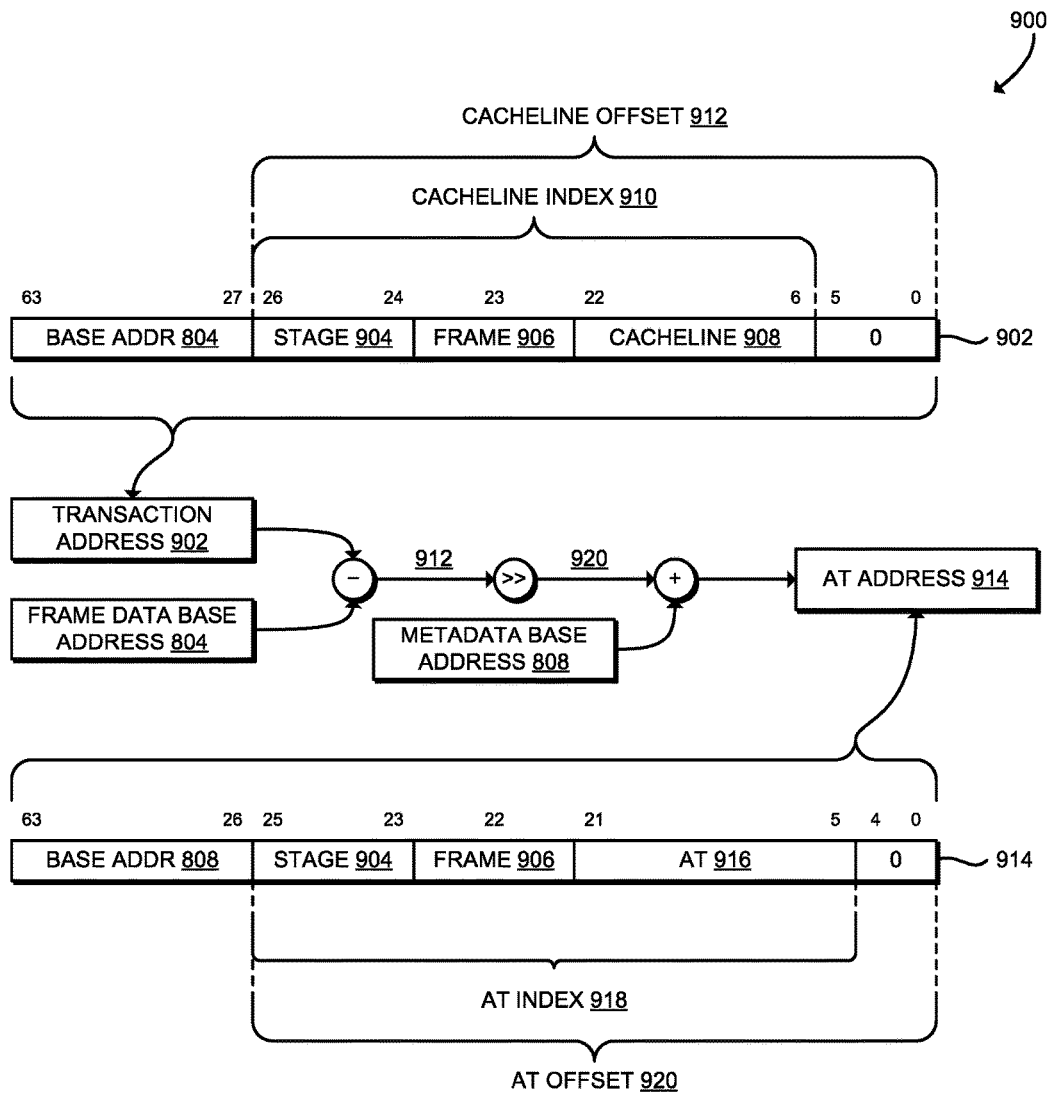
FIG. 9 is a schematic diagram illustrating metadata address calculation that may be performed by the computing device of FIGS. 1-3.

Referring now to FIG. 9, diagram 900 illustrates one potential embodiment of a mapping between the address of a frame data cacheline and the address of corresponding authentication tag (AT) metadata. A transaction address 902 represents the address of a frame buffer data cacheline. The transaction address 902 includes in its high-order bits the frame data base address 804, followed by a stage number 904, a frame number 906, a cacheline number 908, and a number of low-order bits set to zero. The number of low-order bits set to zero is determined by the size of the cacheline. A cacheline index 910, which includes the stage number 904, the frame number 906, and the cacheline number 908, may identify the accessed cacheline within the frame buffer data array. A cacheline offset 912, which includes the stage number 904, the frame number 906, the cacheline number 908, and the low-order zero bits, represents an offset in memory of the cacheline within the frame buffer data array.

An authentication tag (AT) address 914 represents the address of the AT metadata corresponding to the transaction address 902. The AT address 914 includes in its high-order bits the metadata base address 808, followed by the stage number 904, the frame number 906, an AT number 916, and a number of low-order bits set to zero. The number of low-order bits set to zero is determined by the size of the AT metadata. An AT index 918, which includes the stage number 904, the frame number 906, and the AT number 916, may identify the AT metadata within the frame metadata array. An AT offset 920, which includes the stage number 904, the frame number 906, the AT number 916, and the low-order zero bits, represents an offset in memory of the AT data within the frame metadata array.

As shown, the frame data base address 804 may be subtracted from the transaction address 902 to produce the cacheline offset 912. In the illustrative embodiment, the cacheline offset may be right-shifted by one to produce the AT offset 920. The AT offset 920 may be added to the metadata base address 808 to generate the AT address 914.

It should be appreciated that, in some embodiments, the methods 400, 600, and/or 700 may be embodied as various instructions stored on a computer-readable media, which may be executed by the processor 120, the cryptographic engine 140, and/or other components of the computing device 100 to cause the computing device 100 to perform the corresponding method 400, 600, and/or 700. The computer-readable media may be embodied as any type of media capable of being read by the computing device 100 including, but not limited to, the memory 132, the data storage device 134, memory of the cryptographic engine 140, firmware of the cryptographic engine 140, and/or other media.

EXAMPLES

Illustrative examples of the technologies disclosed herein are provided below. An embodiment of the technologies may include any one or more, and any combination of, the examples described below.

Example 1 includes a computing device for I/O data integrity verification, the computing device comprising: a metadata producer module to: (i) perform an authenticated encryption operation on I/O data associated with an I/O controller of the computing device to generate encrypted I/O data and an authentication tag, (ii) write the encrypted I/O data to a memory buffer associated with a direct memory access operation, and (iii) write the authentication tag to an authentication tag queue in memory; and a metadata consumer module to (i) decrypt the encrypted I/O data in response to the direct memory access operation and (ii) determine whether the encrypted I/O data is authentic with the authentication tag in response to decryption of the encrypted I/O data.

Example 2 includes the subject matter of Example 1, and wherein the metadata producer module comprises a cryptographic engine of the computing device and the metadata consumer module comprises a trusted software component of the computing device.

Example 3 includes the subject matter of any of Examples 1 and 2, and wherein the metadata consumer module is further to process, by the trusted software component, the I/O data in response to a determination that the encrypted I/O data is authentic.

Example 4 includes the subject matter of any of Examples 1-3, and wherein the metadata consumer module is further to indicate, by the trusted software component, integrity failure in response to a determination that the encrypted I/O data is not authentic.

Example 5 includes the subject matter of any of Examples 1-4, and wherein to perform the authenticated encryption operation on the I/O data associated with the I/O controller comprises to: intercept, by the cryptographic engine, a DMA transaction originated by the I/O controller, wherein the DMA transaction includes the I/O data and is associated with a DMA channel identifier; and perform, by the cryptographic engine, the authenticated cryptographic operation in response to interception of the DMA transaction.

Example 6 includes the subject matter of any of Examples 1-5, and wherein the metadata producer module is further to: evaluate, by the cryptographic engine, a write condition to determine whether to write the authentication tag to the authentication tag queue; accumulate, by the cryptographic engine, the authentication tag in an accumulated authentication tag in response to a determination not to write the authentication tag to the authentication tag queue; and write, by the cryptographic engine, the accumulated authentication tag in response to a determination to write the authentication tag to the authentication tag queue.

Example 7 includes the subject matter of any of Examples 1-6, and wherein to evaluate the write condition to determine whether to write the authentication tag to the authentication tag queue comprises to: compare a length of the DMA transaction to a DMA channel maximum transfer unit of the I/O controller; compare an accumulated number of bytes of I/O data for the DMA channel to a maximum length for authentication tag generation; determine whether the DMA transaction crosses a page boundary from a previous DMA transaction; determine whether an end of message flag of the DMA transaction is set; or compare the DMA channel identifier of the DMA transaction to a DMA channel identifier of a previous DMA transaction.

Example 8 includes the subject matter of any of Examples 1-7, and wherein the metadata producer module comprises a trusted software component of the computing device and the metadata consumer module comprises a cryptographic engine of the computing device.

Example 9 includes the subject matter of any of Examples 1-8, and wherein the metadata consumer module is further to output, by the cryptographic engine, the I/O data to the I/O controller in response to a determination that the encrypted I/O data is authentic.

Example 10 includes the subject matter of any of Examples 1-9, and wherein the metadata consumer module is further to execute, by the cryptographic engine, a cryptographic engine failure mode in response to a determination that the encrypted I/O data is not authentic.

Example 11 includes the subject matter of any of Examples 1-10, and wherein the metadata producer module comprises a cryptographic engine of the computing device and the metadata consumer module comprises the cryptographic engine.

Example 12 includes the subject matter of any of Examples 1-11, and wherein the authentication tag queue comprises a linked list of authentication tag structure arrays, wherein each of the authentication tag structure arrays comprises a memory page, and wherein each authentication tag structure array comprises a next array pointer and a plurality of authentication tag structures.

Example 13 includes the subject matter of any of Examples 1-12, and wherein to determine whether the encrypted I/O data is authentic with the authentication tag comprises to: read an authentication tag structure from the authentication tag queue, wherein the authentication tag structure comprises a message length value and the authentication tag; read a first number of bytes from the memory buffer associated with the direct memory access operation, wherein the first number of bytes is the message length value; and perform authenticated decryption of the first number of bytes with the authentication tag to determine whether the encrypted I/O data is authentic.

Example 14 includes the subject matter of any of Examples 1-13, and wherein to determine whether the encrypted I/O data is authentic with the authentication tag further comprises to: add the first number of bytes to a message length counter in response to a determination that the encrypted I/O data is authentic; determine whether the message length counter is less than a size of the memory buffer associated with the direct memory access operation; read a next authentication tag structure from the authentication tag queue in response to a determination that the message length counter is less than the size of the memory buffer; and return success in response to a determination that the message length counter is not less than the size of the memory buffer.

Example 15 includes the subject matter of any of Examples 1-14, and wherein to determine whether the encrypted I/O data is authentic with the authentication tag further comprises to return failure in response to a determination that the encrypted I/O data is not authentic.

Example 16 includes a computing device for I/O data integrity verification, the computing device comprising: a video capture module to monitor for an access to a cacheline of a frame buffer data array, wherein the frame buffer data array comprises frame data captured by a video capture controller of the computing device; and a metadata access module to (i) determine a metadata address as a function of an address of the cacheline and (ii) access a frame authentication tag structure using the metadata address, wherein the frame authentication tag structure is included in a frame metadata array corresponding to the frame buffer data array.

Example 17 includes the subject matter of Example 16, and wherein: the frame buffer data array comprises a first number of stages, each stage comprising a second number of frames, and each frame comprising a third number of cachelines; and the frame metadata array comprises the first number of stages, and each stage comprising the second number of frames, and each frame comprises the third number of authentication tag structures.

Example 18 includes the subject matter of any of Examples 16 and 17, and wherein the metadata access module is further to authenticate the cacheline of the frame buffer data with the frame authentication tag structure in response to an access of the frame authentication tag structure.

Example 19 includes the subject matter of any of Examples 16-18, and wherein to determine the metadata address comprises to: determine a cacheline offset of the cacheline; adjust the cacheline offset to determine an authentication tag structure offset; and determine the metadata address based on the authentication tag structure offset.

Example 20 includes the subject matter of any of Examples 16-19, and wherein: to determine the cacheline offset comprises to subtract a base address of the frame buffer data array from the address of the cacheline; to adjust the cacheline offset to determine the authentication tag structure offset comprises to bitwise shift the cacheline offset; and to determine the metadata address comprises to add the authentication tag structure offset to a base address of the frame metadata array.

Example 21 includes a method for I/O data integrity verification, the method comprising: performing, by a metadata producer of a computing device, an authenticated encryption operation on I/O data associated with an I/O controller of the computing device to generate encrypted I/O data and an authentication tag; writing, by the metadata producer, the encrypted I/O data to a memory buffer associated with a direct memory access operation; writing, by the metadata producer, the authentication tag to an authentication tag queue in memory; decrypting, by a metadata consumer of the computing device; the encrypted I/O data in response to the direct memory access operation; and determining, by the metadata consumer, whether the encrypted I/O data is authentic using the authentication tag in response to decrypting the encrypted I/O data.

Example 22 includes the subject matter of Example 21, and wherein the metadata producer comprises a cryptographic engine of the computing device and the metadata consumer comprises a trusted software component of the computing device.

Example 23 includes the subject matter of any of Examples 21 and 22, and further comprising processing, by the trusted software component, the I/O data in response to determining that the encrypted I/O data is authentic.

Example 24 includes the subject matter of any of Examples 21-23, and further comprising indicating, by the trusted software component, integrity failure in response to determining that the encrypted I/O data is not authentic.

Example 25 includes the subject matter of any of Examples 21-24, and wherein performing the authenticated encryption operation on the I/O data associated with the I/O controller comprises: intercepting, by the cryptographic engine, a DMA transaction originated by the I/O controller, wherein the DMA transaction includes the I/O data and is associated with a DMA channel identifier; and performing, by the cryptographic engine, the authenticated cryptographic operation in response to intercepting the DMA transaction.

Example 26 includes the subject matter of any of Examples 21-25, and further comprising: evaluating, by the cryptographic engine, a write condition to determine whether to write the authentication tag to the authentication tag queue; accumulating, by the cryptographic engine, the authentication tag in an accumulated authentication tag in response to a determination not to write the authentication tag to the authentication tag queue; and writing, by the cryptographic engine, the accumulated authentication tag in response to a determination to write the authentication tag to the authentication tag queue.

Example 27 includes the subject matter of any of Examples 21-26, and wherein evaluating the write condition to determine whether to write the authentication tag to the authentication tag queue comprises: comparing a length of the DMA transaction to a DMA channel maximum transfer unit of the I/O controller; comparing an accumulated number of bytes of I/O data for the DMA channel to a maximum length for authentication tag generation; determining whether the DMA transaction crosses a page boundary from a previous DMA transaction; determining whether an end of message flag of the DMA transaction is set; or comparing the DMA channel identifier of the DMA transaction to a DMA channel identifier of a previous DMA transaction.

Example 28 includes the subject matter of any of Examples 21-27, and wherein the metadata producer comprises a trusted software component of the computing device and the metadata consumer comprises a cryptographic engine of the computing device.

Example 29 includes the subject matter of any of Examples 21-28, and further comprising outputting, by the cryptographic engine, the I/O data to the I/O controller in response to determining that the encrypted I/O data is authentic.

Example 30 includes the subject matter of any of Examples 21-29, and further comprising executing, by the cryptographic engine, a cryptographic engine failure mode in response to determining that the encrypted I/O data is not authentic.

Example 31 includes the subject matter of any of Examples 21-30, and wherein the metadata producer comprises a cryptographic engine of the computing device and the metadata consumer comprises the cryptographic engine.

Example 32 includes the subject matter of any of Examples 21-31, and wherein the authentication tag queue comprises a linked list of authentication tag structure arrays, wherein each of the authentication tag structure arrays comprises a memory page, and wherein each authentication tag structure array comprises a next array pointer and a plurality of authentication tag structures.

Example 33 includes the subject matter of any of Examples 21-32, and wherein determining whether the encrypted I/O data is authentic using the authentication tag comprises: reading an authentication tag structure from the authentication tag queue, wherein the authentication tag structure comprises a message length value and the authentication tag; reading a first number of bytes from the memory buffer associated with the direct memory access operation, wherein the first number of bytes is the message length value; and performing authenticated decryption of the first number of bytes using the authentication tag to determine whether the encrypted I/O data is authentic.

Example 34 includes the subject matter of any of Examples 21-33, and wherein determining whether the encrypted I/O data is authentic using the authentication tag further comprises: adding the first number of bytes to a message length counter in response to a determination that the encrypted I/O data is authentic; determining whether the message length counter is less than a size of the memory buffer associated with the direct memory access operation; reading a next authentication tag structure from the authentication tag queue in response to determining that the message length counter is less than the size of the memory buffer; and returning success in response to determining that the message length counter is not less than the size of the memory buffer.

Example 35 includes the subject matter of any of Examples 21-34, and wherein determining whether the encrypted I/O data is authentic using the authentication tag further comprises returning failure in response to a determination that the encrypted I/O data is not authentic.

Example 36 includes a method for I/O data integrity verification, the method comprising: monitoring, by a computing device, for an access to a cacheline of a frame buffer data array, wherein the frame buffer data array comprises frame data captured by a video capture controller of the computing device; determining, by the computing device, a metadata address as a function of an address of the cacheline; and accessing, by the computing device, a frame authentication tag structure using the metadata address, wherein the frame authentication tag structure is included in a frame metadata array corresponding to the frame buffer data array.

Example 37 includes the subject matter of Example 36, and wherein: the frame buffer data array comprises a first number of stages, each stage comprising a second number of frames, and each frame comprising a third number of cachelines; and the frame metadata array comprises the first number of stages, and each stage comprising the second number of frames, and each frame comprises the third number of authentication tag structures.

Example 38 includes the subject matter of any of Examples 36 and 37, and further comprising authenticating, by the computing device, the cacheline of the frame buffer data using the frame authentication tag structure in response to accessing the frame authentication tag structure.

Example 39 includes the subject matter of any of Examples 36-38, and wherein determining the metadata address comprises: determining a cacheline offset of the cacheline; adjusting the cacheline offset to determine an authentication tag structure offset; and determining the metadata address based on the authentication tag structure offset.

Example 40 includes the subject matter of any of Examples 36-39, and wherein: determining the cacheline offset comprises subtracting a base address of the frame buffer data array from the address of the cacheline; adjusting the cacheline offset to determine the authentication tag structure offset comprises bitwise shifting the cacheline offset; and determining the metadata address comprises adding the authentication tag structure offset to a base address of the frame metadata array.

Example 41 includes a computing device comprising: a processor; and a memory having stored therein a plurality of instructions that when executed by the processor cause the computing device to perform the method of any of Examples 21-40.

Example 42 includes one or more machine readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for I/O data integrity verification, the computing device comprising: means for performing, by a metadata producer of the computing device, an authenticated encryption operation on I/O data associated with an I/O controller of the computing device to generate encrypted I/O data and an authentication tag; means for writing, by the metadata producer, the encrypted I/O data to a memory buffer associated with a direct memory access operation; means for writing, by the metadata producer, the authentication tag to an authentication tag queue in memory; means for decrypting, by a metadata consumer of the computing device; the encrypted I/O data in response to the direct memory access operation; and means for determining, by the metadata consumer, whether the encrypted I/O data is authentic using the authentication tag in response to decrypting the encrypted I/O data.

Example 45 includes the subject matter of Example 44, and wherein the metadata producer comprises a cryptographic engine of the computing device and the metadata consumer comprises a trusted software component of the computing device.

Example 46 includes the subject matter of any of Examples 44 and 45, and further comprising means for processing, by the trusted software component, the I/O data in response to determining that the encrypted I/O data is authentic.

Example 47 includes the subject matter of any of Examples 44-46, and further comprising means for indicating, by the trusted software component, integrity failure in response to determining that the encrypted I/O data is not authentic.

Example 48 includes the subject matter of any of Examples 44-47, and wherein the means for performing the authenticated encryption operation on the I/O data associated with the I/O controller comprises: means for intercepting, by the cryptographic engine, a DMA transaction originated by the I/O controller, wherein the DMA transaction includes the I/O data and is associated with a DMA channel identifier; and means for performing, by the cryptographic engine, the authenticated cryptographic operation in response to intercepting the DMA transaction.

Example 49 includes the subject matter of any of Examples 44-48, and further comprising: means for evaluating, by the cryptographic engine, a write condition to determine whether to write the authentication tag to the authentication tag queue; means for accumulating, by the cryptographic engine, the authentication tag in an accumulated authentication tag in response to a determination not to write the authentication tag to the authentication tag queue; and means for writing, by the cryptographic engine, the accumulated authentication tag in response to a determination to write the authentication tag to the authentication tag queue.

Example 50 includes the subject matter of any of Examples 44-49, and wherein the means for evaluating the write condition to determine whether to write the authentication tag to the authentication tag queue comprises: means for comparing a length of the DMA transaction to a DMA channel maximum transfer unit of the I/O controller; means for comparing an accumulated number of bytes of I/O data for the DMA channel to a maximum length for authentication tag generation; means for determining whether the DMA transaction crosses a page boundary from a previous DMA transaction; means for determining whether an end of message flag of the DMA transaction is set; or means for comparing the DMA channel identifier of the DMA transaction to a DMA channel identifier of a previous DMA transaction.

Example 51 includes the subject matter of any of Examples 44-50, and wherein the metadata producer comprises a trusted software component of the computing device and the metadata consumer comprises a cryptographic engine of the computing device.

Example 52 includes the subject matter of any of Examples 44-51, and further comprising means for outputting, by the cryptographic engine, the I/O data to the I/O controller in response to determining that the encrypted I/O data is authentic.

Example 53 includes the subject matter of any of Examples 44-52, and further comprising means for executing, by the cryptographic engine, a cryptographic engine failure mode in response to determining that the encrypted I/O data is not authentic.

Example 54 includes the subject matter of any of Examples 44-53, and wherein the metadata producer comprises a cryptographic engine of the computing device and the metadata consumer comprises the cryptographic engine.

Example 55 includes the subject matter of any of Examples 44-54, and wherein the authentication tag queue comprises a linked list of authentication tag structure arrays, wherein each of the authentication tag structure arrays comprises a memory page, and wherein each authentication tag structure array comprises a next array pointer and a plurality of authentication tag structures.

Example 56 includes the subject matter of any of Examples 44-55, and wherein the means for determining whether the encrypted I/O data is authentic using the authentication tag comprises: means for reading an authentication tag structure from the authentication tag queue, wherein the authentication tag structure comprises a message length value and the authentication tag; means for reading a first number of bytes from the memory buffer associated with the direct memory access operation, wherein the first number of bytes is the message length value; and means for performing authenticated decryption of the first number of bytes using the authentication tag to determine whether the encrypted I/O data is authentic.

Example 57 includes the subject matter of any of Examples 44-56, and wherein the means for determining whether the encrypted I/O data is authentic using the authentication tag further comprises: means for adding the first number of bytes to a message length counter in response to a determination that the encrypted I/O data is authentic; means for determining whether the message length counter is less than a size of the memory buffer associated with the direct memory access operation; means for reading a next authentication tag structure from the authentication tag queue in response to determining that the message length counter is less than the size of the memory buffer; and means for returning success in response to determining that the message length counter is not less than the size of the memory buffer.

Example 58 includes the subject matter of any of Examples 44-57, and wherein the means for determining whether the encrypted I/O data is authentic using the authentication tag further comprises means for returning failure in response to a determination that the encrypted I/O data is not authentic.

Example 59 includes a computing device for I/O data integrity verification, the computing device comprising: means for monitoring for an access to a cacheline of a frame buffer data array, wherein the frame buffer data array comprises frame data captured by a video capture controller of the computing device; means for determining a metadata address as a function of an address of the cacheline; and means for accessing a frame authentication tag structure using the metadata address, wherein the frame authentication tag structure is included in a frame metadata array corresponding to the frame buffer data array.

Example 60 includes the subject matter of Example 59, and wherein: the frame buffer data array comprises a first number of stages, each stage comprising a second number of frames, and each frame comprising a third number of cachelines; and the frame metadata array comprises the first number of stages, and each stage comprising the second number of frames, and each frame comprises the third number of authentication tag structures.

Example 61 includes the subject matter of any of Examples 59 and 60, and further comprising means for authenticating the cacheline of the frame buffer data using the frame authentication tag structure in response to accessing the frame authentication tag structure.

Example 62 includes the subject matter of any of Examples 59-61, and wherein determining the metadata address comprises: means for determining a cacheline offset of the cacheline; means for adjusting the cacheline offset to determine an authentication tag structure offset; and means for determining the metadata address based on the authentication tag structure offset.

Example 63 includes the subject matter of any of Examples 59-62, and wherein: the means for determining the cacheline offset comprises means for subtracting a base address of the frame buffer data array from the address of the cacheline; the means for adjusting the cacheline offset to determine the authentication tag structure offset comprises means for bitwise shifting the cacheline offset; and the means for determining the metadata address comprises means for adding the authentication tag structure offset to a base address of the frame metadata array.

The invention claimed is:

1. A computing device for input/output ("I/O") data integrity verification, the computing device comprising:
 a metadata producer module to: (i) perform an authenticated encryption operation on I/O data associated with an I/O controller of the computing device to generate encrypted I/O data and an authentication tag, (ii) write the encrypted I/O data to a memory buffer associated with a direct memory access operation, wherein the memory buffer is stored within a memory device of the computing device, and (iii) write the authentication tag to an authentication tag queue stored within the memory device; and
 a metadata consumer module to (i) decrypt the encrypted I/O data in response to the direct memory access operation and (ii) determine whether the encrypted I/O data is authentic with the authentication tag in response to decryption of the encrypted I/O data.

2. The computing device of claim 1, wherein the metadata producer module comprises a cryptographic engine of the computing device and the metadata consumer module comprises a trusted software component of the computing device.

3. The computing device of claim 2, wherein the metadata consumer module is further to indicate, by the trusted software component, integrity failure in response to a determination that the encrypted I/O data is not authentic.

4. The computing device of claim 2, wherein to perform the authenticated encryption operation on the I/O data associated with the I/O controller comprises to:
 intercept, by the cryptographic engine, a direct memory access ("DMA") transaction originated by the I/O controller, wherein the DMA transaction includes the I/O data and is associated with a DMA channel identifier; and
 perform, by the cryptographic engine, the authenticated cryptographic operation in response to interception of the DMA transaction.

5. The computing device of claim 4, wherein the metadata producer module is further to:
 evaluate, by the cryptographic engine, a write condition to determine whether to write the authentication tag to the authentication tag queue;

accumulate, by the cryptographic engine, the authentication tag in an accumulated authentication tag in response to a determination not to write the authentication tag to the authentication tag queue; and write, by the cryptographic engine, the accumulated authentication tag in response to a determination to write the authentication tag to the authentication tag queue.

6. The computing device of claim 1, wherein the metadata producer module comprises a trusted software component of the computing device and the metadata consumer module comprises a cryptographic engine of the computing device.

7. The computing device of claim 6, wherein the metadata consumer module is further to execute, by the cryptographic engine, a cryptographic engine failure mode in response to a determination that the encrypted I/O data is not authentic.

8. The computing device of claim 1, wherein the authentication tag queue comprises a linked list of authentication tag structure arrays, wherein each of the authentication tag structure arrays comprises a memory page, and wherein each authentication tag structure array comprises a next array pointer and a plurality of authentication tag structures.

9. The computing device of claim 1, wherein to determine whether the encrypted I/O data is authentic with the authentication tag comprises to:

read an authentication tag structure from the authentication tag queue, wherein the authentication tag structure comprises a message length value and the authentication tag;

read a first number of bytes from the memory buffer associated with the direct memory access operation, wherein the first number of bytes is the message length value; and perform authenticated decryption of the first number of bytes with the authentication tag to determine whether the encrypted I/O data is authentic.

10. The computing device of claim 9, wherein to determine whether the encrypted I/O data is authentic with the authentication tag further comprises to:

add the first number of bytes to a message length counter in response to a determination that the encrypted I/O data is authentic;

determine whether the message length counter is less than a size of the memory buffer associated with the direct memory access operation;

read a next authentication tag structure from the authentication tag queue in response to a determination that the message length counter is less than the size of the memory buffer; and return success in response to a determination that the message length counter is not less than the size of the memory buffer.

11. One or more non-transitory, machine readable storage media comprising a plurality of instructions that in response to being executed cause a computing device to:

performing, by a metadata producer of the computing device, an authenticated encryption operation on input/output ("I/O") data associated with an I/O controller of the computing device to generate encrypted I/O data and an authentication tag;

writing, by the metadata producer, the encrypted I/O data to a memory buffer associated with a direct memory access operation, wherein the memory buffer is stored within a memory device of the computing device;

writing, by the metadata producer, the authentication tag to an authentication tag queue stored within the memory device;

decrypting, by a metadata consumer of the computing device; the encrypted I/O data in response to the direct memory access operation; and determining, by the metadata consumer, whether the encrypted I/O data is authentic using the authentication tag in response to decrypting the encrypted I/O data.

12. The one or more non-transitory, machine readable storage media of claim 11, wherein the metadata producer comprises a cryptographic engine of the computing device and the metadata consumer comprises a trusted software component of the computing device.

13. The one or more non-transitory, machine readable storage media of claim 12, wherein to perform the authenticated encryption operation on the I/O data associated with the I/O controller comprises to:

intercept, by the cryptographic engine, a direct memory access ("DMA") transaction originated by the I/O controller, wherein the DMA transaction includes the I/O data and is associated with a DMA channel identifier; and perform, by the cryptographic engine, the authenticated cryptographic operation in response to intercepting the DMA transaction.

14. The one or more non-transitory, machine readable storage media of claim 13, further comprising a plurality of instructions that in response to being executed cause the computing device to:

evaluate, by the cryptographic engine, a write condition to determine whether to write the authentication tag to the authentication tag queue;

accumulate, by the cryptographic engine, the authentication tag in an accumulated authentication tag in response to a determination not to write the authentication tag to the authentication tag queue; and write, by the cryptographic engine, the accumulated authentication tag in response to a determination to write the authentication tag to the authentication tag queue.

15. The one or more non-transitory, machine readable storage media of claim 11, wherein the metadata producer comprises a trusted software component of the computing device and the metadata consumer comprises a cryptographic engine of the computing device.

16. The one or more non-transitory, machine readable storage media of claim 11, wherein the authentication tag queue comprises a linked list of authentication tag structure arrays, wherein each of the authentication tag structure arrays comprises a memory page, and wherein each authentication tag structure array comprises a next array pointer and a plurality of authentication tag structures.

17. The one or more non-transitory, machine readable storage media of claim 11, wherein to determine whether the encrypted I/O data is authentic using the authentication tag comprises to:

read an authentication tag structure from the authentication tag queue, wherein the authentication tag structure comprises a message length value and the authentication tag;

read a first number of bytes from the memory buffer associated with the direct memory access operation, wherein the first number of bytes is the message length value; and perform authenticated decryption of the first number of bytes using the authentication tag to determine whether the encrypted I/O data is authentic.

18. The one or more non-transitory, machine readable storage media of claim 17, wherein to determine whether the encrypted I/O data is authentic using the authentication tag further comprises to:
- add the first number of bytes to a message length counter in response to a determination that the encrypted I/O data is authentic;
- determine whether the message length counter is less than a size of the memory buffer associated with the direct memory access operation;
- read a next authentication tag structure from the authentication tag queue in response to determining that the message length counter is less than the size of the memory buffer; and
- return success in response to determining that the message length counter is not less than the size of the memory buffer.

19. A computing device for input/output ("I/O") data integrity verification, the computing device comprising:
- a video capture controller;
- a video capture hardware module to monitor for an access to a cacheline of a frame buffer data array, wherein the frame buffer data array comprises frame data captured by the video capture controller of the computing device; and
- a metadata access hardware module to (i) determine a metadata address as a function of an address of the cacheline and (ii) access a frame authentication tag structure using the metadata address, wherein the frame authentication tag structure is included in a frame metadata array corresponding to the frame buffer data array;
- wherein the frame buffer data array and the frame metadata array are stored within a memory device of the computing device.

20. The computing device of claim 19, wherein:
- the frame buffer data array comprises a first number of stages, each stage comprising a second number of frames, and each frame comprising a third number of cachelines; and
- the frame metadata array comprises the first number of stages, and each stage comprising the second number of frames, and each frame comprises the third number of authentication tag structures.

21. The computing device of claim 19, wherein to determine the metadata address comprises to:
- determine a cacheline offset of the cacheline;
- adjust the cacheline offset to determine an authentication tag structure offset; and
- determine the metadata address based on the authentication tag structure offset.

22. The computing device of claim 21, wherein:
- to determine the cacheline offset comprises to subtract a base address of the frame buffer data array from the address of the cacheline;
- to adjust the cacheline offset to determine the authentication tag structure offset comprises to bitwise shift the cacheline offset; and
- to determine the metadata address comprises to add the authentication tag structure offset to a base address of the frame metadata array.

23. One or more machine non-transitory, readable storage media comprising a plurality of instructions that in response to being executed cause a computing device to:
- monitor for an access to a cacheline of a frame buffer data array, wherein the frame buffer data array comprises frame data captured by a video capture controller of the computing device;
- determine a metadata address as a function of an address of the cacheline; and
- access a frame authentication tag structure using the metadata address, wherein the frame authentication tag structure is included in a frame metadata array corresponding to the frame buffer data array;
- wherein the frame buffer data array and the frame metadata array are stored within a memory device of the computing device.

24. The one or more non-transitory, machine readable storage media of claim 23, wherein:
- the frame buffer data array comprises a first number of stages, each stage comprising a second number of frames, and each frame comprising a third number of cachelines; and
- the frame metadata array comprises the first number of stages, and each stage comprising the second number of frames, and each frame comprises the third number of authentication tag structures.

25. The one or more non-transitory, machine readable storage media of claim 23, wherein to determine the metadata address comprises to:
- determine a cacheline offset of the cacheline;
- adjust the cacheline offset to determine an authentication tag structure offset; and
- determine the metadata address based on the authentication tag structure offset.

* * * * *